A. K. LEE.
Distilling Turpentine.
No. 5,351.
Reissued April 15, 1873.
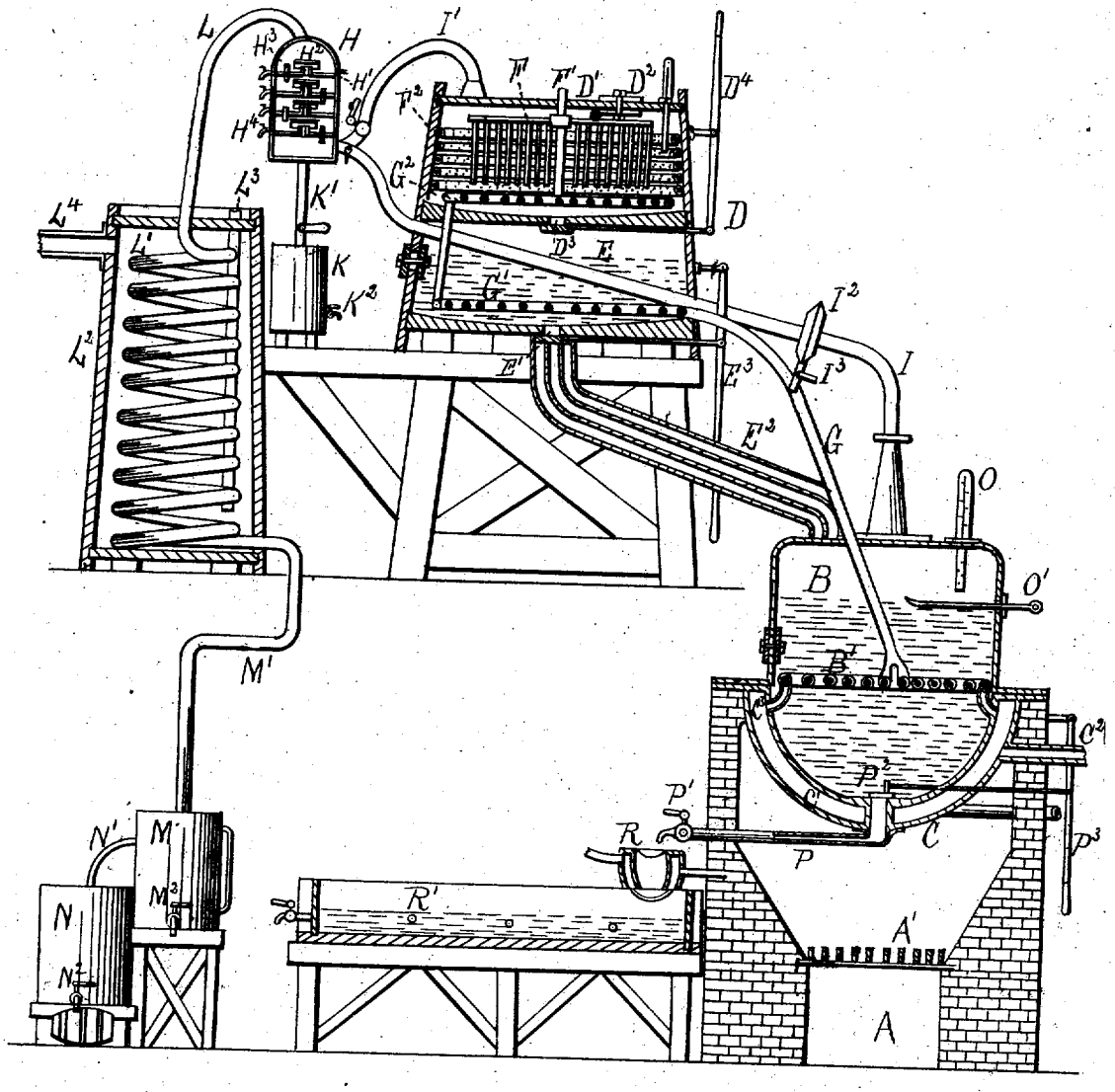
Witnesses.
Edwin James.
K. V. Gordon.
Inventor.
Archibald K. Lee.
per J. E. D. Holmead.
Attorney.

UNITED STATES PATENT OFFICE.

ARCHIBALD K. LEE, OF GALVESTON, TEXAS.

IMPROVEMENT IN DISTILLING TURPENTINE.

Specification forming part of Letters Patent No. 131,550, dated September 24, 1872; reissue No. 5,351, dated April 15, 1873; application filed April 8, 1873.

*To all whom it may concern:*

Be it known that I, ARCHIBALD K. LEE, of Galveston, in the county of Galveston and State of Texas, did invent certain new and useful Improvements in Apparatus for Distilling Turpentine, on which Letters Patent of the United States were granted bearing date September 24, 1872, and numbered 131,550; and that the following is a full, clear, and exact description of said invention, reference being had to the accompanying drawing and the letters of reference marked thereon making part of this specification, in which is represented a vertical sectional view of my apparatus.

The object of my invention consists in so constructing the apparatus as to permit of a continuous distillation, or in so arranging the apparatus that so soon as the crude turpentine is liquidized it is conveyed to a suitable chamber, and from which it is at pleasure fed to the still, thus permitting each and every stage of the process of distillation being carried on in the apparatus at one and the same time, the still evaporating the crude turpentine fed from the intermediate chamber or reservoir while the liquidizing-chamber is preparing a fresh supply. The liquidizing-chamber, reservoir, and still are connected by means of valves and a jacketed pipe in such manner that the contents of the one are readily fed to the other, as occasion requires, which insures an uninterrupted action of the apparatus throughout the different stages of the process of distillation. My improvement also consists in so arranging and securing a pipe in connection with the steam-coil of the still and the reservoir and liquidizing-chamber that the steam which aids in the evaporation of the crude liquidized turpentine shall serve to preserve the desired and uniform temperature in the intermediate chamber and reservoir, and also aid in supplying the necessary heat to liquidize the crude material. My improvement also consists in surrounding the lower section of the still with a jacket, in such manner as to provide a superheating steam-chamber, and from which the coil within the still is supplied, and in so arranging the still and jacket, in connection with the fire-pot of the furnace, that while the jacket protects the still from the direct action of the heat, yet the same shall so act on the jacket itself as to cause the steam in its passage through the chamber which the jacket forms, and as it passes around the lower section of the still, to become superheated. My improvement also consists in surrounding the interior wall of the liquidizing-chamber with a perforated coil, and in providing the same with a revolving rake or stirrer, which is operated through a vertical shaft having its bearings at the center of said chamber. Practical experience has shown that the continued agitation of the mass in connection with the jets of steam from the perforated coil and the heat communicated from the coil of the still combined insure the most rapid liquidization of the mass of crude material. My invention also consists in connecting the still and liquidation-chamber each with the separator by means of pipes, which lead, respectively, from the upper section of these vessels to the lower section of the separator, and which permits the vapor, as rapidly as it is generated in either of the vessels, being conveyed immediately to the separator, and also in providing the pipe which leads from the still with an egg or expanded joint which receives the heaver liquid particles which may be thrown off from the evaporating-chamber of the still. My improvement also consists in connecting a separator, constructed as hereinafter described, with a vessel so arranged as to receive the pyroligneous-acid water and other impurities as they are separated from the vaporized material, thus saving the same and providing an article of commerce heretofore wasted in devices of this character. My improvement also consists in conveying the turpentine from the condenser to a close vessel, so arranged as to secure the entire separation therefrom of all condensed steam, and in then passing the turpentine to another close vessel, from which it is barreled.

The great advantage of this arrangement of vessels in connection with the condenser is that all danger of evaporation is securely guarded against, and a purer article is produced in consequence.

The construction and operation of my invention are as follows:

A is a furnace, and A′ A′ the grate-bars, which may be of any desired form or pattern, and are constructed in the usual manner. I is the still, which is constructed out of any suitable material, and at its lower section or base is of a concave or circular form. Within the vaporizing-chamber of the still B is arranged an ordinary coil, B′, and around the outer curved surface of the still is a jacket, C, which is so arranged in connection therewith as to leave or furnish a superheating steam-chamber, $C^1$. Steam from a boiler suitably arranged is, by means of the pipe $C^2$, supplied to this chamber $C^1$, and after passing under and around the lower section of the still B by means of the pipe $C^3$ is conveyed to the coil B′.

By reference to the drawing it will be seen that, in consequence of my arrangement of the still B and jacket C in connection with the fire-pot of the furnace, while the jacket C entirely protects the still B from the direct action of the heat, yet the same is itself so acted on as to insure the superheating of all steam admitted through the pipe $C^2$ as it passes through the chamber $C^1$, and, consequently, under and in direct contact with the still B, in which superheated condition through the pipe $C^3$ it is fed to the coil B′. D is a chamber, and is divided into two compartments, the upper one, $D^1$, being a liquidizing-chamber, into which, by means of a man-hole, $D^2$, the crude turpentine is supplied, and the lower one, E, being a reservoir, into which the crude turpentine, after being sufficiently liquidized, is allowed to pass by means of the valve $D^3$, which is opened and closed at pleasure by the valve-rod and lever $D^4$. From this reservoir E, by means of the valve $E^1$ and jacketed pipe $E^2$, the liquidized crude turpentine is fed, as occasion may require, to the evaporating-chamber of the still B. This valve $E^1$ is operated so as to be opened and closed at pleasure, by means of a valve-rod and lever, $E^3$. Within the liquidizing-chamber $D^1$ is secured, on a vertical shaft, $F^1$, the rake or stirrer F. The shaft is secured so as to revolve freely in suitable bearings on the upper and lower surfaces of the chamber and at the centers thereof, while the rake or stirrer F is constructed of any suitable material, and is of the form clearly shown on the drawing. Around the interior wall of this chamber $D^1$ is a perforated coil, $F^2$, which is designed to emit jets of steam through the mass of crude turpentine, to aid in its liquidization, while the same is being continually agitated by the revolving rake or stirrer F. G is a pipe connected with the coil B′, by means of which the superheated steam is conveyed from the coil up through the upper section of the still B, and thence to the reservoir E, where it serves to maintain the liquidized turpentine at a uniform temperature, and thence to the chamber $D^1$, where it aids in liquidizing the crude material. The sections of this pipe G, which are within the reservoir E and chamber $D^1$, are perforated, as clearly shown at $G^1$ $G^2$. H is the separator, and consists of a column having a series of trays or partitions $H^1$ $H^1$, having openings at their centers, over which are deflecting-caps $H^2$ $H^2$. Immediately below these caps are openings or orifices leading into the interior chamber of the separator, which allow of the free passage of all the products of evaporization which are driven into the separator. Through an opening in each of the trays $H^1$ $H^1$ is secured a pipe, $H^3$, the upper section of which is immediately below the orifice through which the caps $H^2$ $H^2$ deflect the vapors, acid, &c. At the upper section of the still B and the liquidizing-compartment $D^1$, and communicating with the interior chambers thereof, are vapor pipes or tubes I and $I^1$, which lead directly to the separator H, entering the same at the lower section thereof, as clearly shown in the drawing. Through these pipes are fed the material as fast as the same is evaporated. The pipe I is provided with an egg or expanded joint, $I^2$, which receives any heavy liquid particles which may be driven with the vapor from the still. The chamber which this expanded joint forms is emptied at pleasure by means of the stop-cock $I^3$. K is a receptacle, which is connected with the separator by means of the pipe $K^1$, and into which the pyroligneous-acid water, which is thrown off from the vapor in its passage through the separator, is collected instead of being wasted, as heretofore has been the practice. From the center of the dome of the separator leads a pipe, L, which communicates directly with the condensing-worm $L^1$, and which is of ordinary construction, and incased in a water-tight tank or vessel, $L^2$, in the usual manner. The worm $L^1$ is kept constantly immersed in fresh water by means of the supply-pipe $L^3$. As the water becomes heated it rises, and is discharged through the pipe $L^4$. From the worm $L^1$ the condensed vapor or turpentine is led to a receptacle, M, by means of a pipe, $M^1$, which enters the receptacle M at the lower section of the same. This receptacle M, in a certain sense, also really acts as an additional separator, as in this vessel the steam which may have remained with the vapor and been condensed in the worm is separated from the turpentine and drawn off at pleasure by means of the cock $M^2$. The turpentine is conveyed to the vessel N by means of the pipe $N^1$, from which it is drawn off for barreling by means of the cock $N^2$. The still B is provided with a thermometer, O, and a proof-stick, O′; and from the center of its concave section, and passing through the steam-jacket C, leads a pipe, P, which is provided with a stop-cock, $P^1$. $P^2$ is a sliding valve, which is operated by means of a rod and lever, $P^3$. This valve $P^2$ permits the operator at pleasure to open or shut off the communication between the still and the pipe P. Through this pipe P the resin in a liquid condition is drawn off into the strainer R, and thence to the resin-box R′. The various features of this apparatus are supported or sustained on any suitable framework.

From the foregoing description the operation of the apparatus will be readily understood. The crude material is poured into the chamber $D^1$, and steam is supplied to the perforated coil $F^2$. Motion is then imparted to the shaft $F^1$, which revolves rapidly the rake or stirrer F. This rapid agitation of the mass by the rake, in connection with the jets of steam and the heat from the section $G^2$ of the pipe G, in a short time liquidizes the mass. So soon as this is sufficiently done, the valve $D^3$ is opened by the lever and rod $D^4$, and the crude turpentine, in a liquid state, passes to the intermediate chamber or reservoir E. Thus the chamber $D^1$, being emptied, is in condition to be recharged, which is immediately done. In the vessel E the liquid turpentine is preserved at the desired temperature by means of the section $G^1$ of the pipe G. The coil $B^1$ is continually supplied with superheated steam from the chamber $C^1$. The valve $E^1$ is now opened by means of the valve-rod and lever $E^3$, and through the jacketed pipe $E^2$ is supplied to the still B the liquidized turpentine, where, at an exceedingly low temperature, its evaporization is insured. By means of the steam-chamber $C^1$, coil $B^1$, and the lower section of the pipe G, as rapidly as the evaporization takes place the vapor is fed, by means of the pipe I, to the separator H, as is also any vapor which may be generated in the liquidizing-chamber $D^1$, by means of the pipe $I^1$. Entering the chamber of the separator, it passes up through the opening in the lower tray $H^1$, and, striking against the cap $H^2$, is deflected and escapes by the orifice immediately below the cap again out into the chamber and up through the next, and so on throughout the entire series. But in the passage of the vapor through each of these partitions or trays $H^1$ and under the deflectors $H^2$ it is robbed of more or less of its pyroligneous-acid water, and other impurities, which, being heavier than the vapor, falls and accumulates on the trays, while the vapor continues its ascent. But this acid water and the other impurities can only accumulate to a certain depth, because so soon as they reach a point flush with the upper openings of the pipes $H^3$ $H^3$ they begin to flow down from one tray to another until they reach the bottom of the separator H, from which they are conveyed by the pipe $K^1$ to the vessel K, to be drawn off as wanted by means of the cock $K^2$. The vapor, thus now comparatively free from the acid water, is conveyed by the pipe L to the worm $L^1$, where its condensation takes place. But in the process of condensation of the turpentine considerable steam or moisture has also been condensed, of which it is most desirable to free the turpentine; therefore, from the worm $L^1$ the turpentine and condensed steam are conveyed together to the vessel M by means of the pipe $M^1$, which pipe enters at the lower section of the vessel. The water, being heavier than the turpentine, remains at the bottom, and the turpentine rises until it reaches the opening through which enters the pipe $N^1$, by which pipe, in a pure state, the turpentine is conveyed to the vessel N, and from which it is drawn off into barrels. The liquid resin from the still, the pyroligneous-acid water from the vessel K, and the condensed water from the vessel M are all drawn off, as clearly shown.

From the foregoing description it will readily be seen that each and every stage of the process is carried on in the apparatus at one and the same time.

What I claim as new, and desire to secure by Letters Patent of the United States, is—

1. The still B, closed coil B′, jacket C, and pipes $C^2$ $C^3$, when the same are combined as shown, and arranged in connection with a suitable furnace to operate substantially as described.

2. In combination with the coil B′, the pipe G, the same being arranged to operate in connection with the still B, reservoir E, and liquidizing-chamber $D^1$, substantially as described.

3. The liquidizing-chamber $D^1$ having its interior wall surrounded with a perforated coil, $F^2$, and the revolving rake F, when the same are so combined and arranged as to operate substantially as described.

4. The chamber $D^1$, reservoir E, still B, valves $D^3$ and $E^1$, and the jacketed pipe $E^2$, the whole being constructed and arranged to operate substantially as described.

5. The vapor-pipe I, having an expanded joint, $I^2$, and cock $I^3$, when the same is connected with the still and separator in such manner as to operate substantially as described.

6. The separator H, vessel K, condensing-worm $L^1$, pipes L $K^1$, the same being so constructed, combined, and arranged as to operate substantially as described.

7. The condensing-worm $L^1$, vessels M N, and pipes $M^1$ $N^1$, the same being so constructed, combined, and arranged as to operate substantially as described.

In testimony whereof I have signed my name to this specification before two subscribing witnesses.

ARCHIBALD K. LEE.

Witnesses:
EDWIN JAMES,
JOS. T. K. PLANT.